3,272,725
METHOD OF ELECTROLYTICALLY TESTING OXYGEN CONCENTRATION
Arthur W. Garst, Tulsa, Okla., assignor to Pan American Petroleum Corporation, Tulsa, Okla., a corporation of Delaware
Filed May 8, 1963, Ser. No. 278,965
5 Claims. (Cl. 204—1)

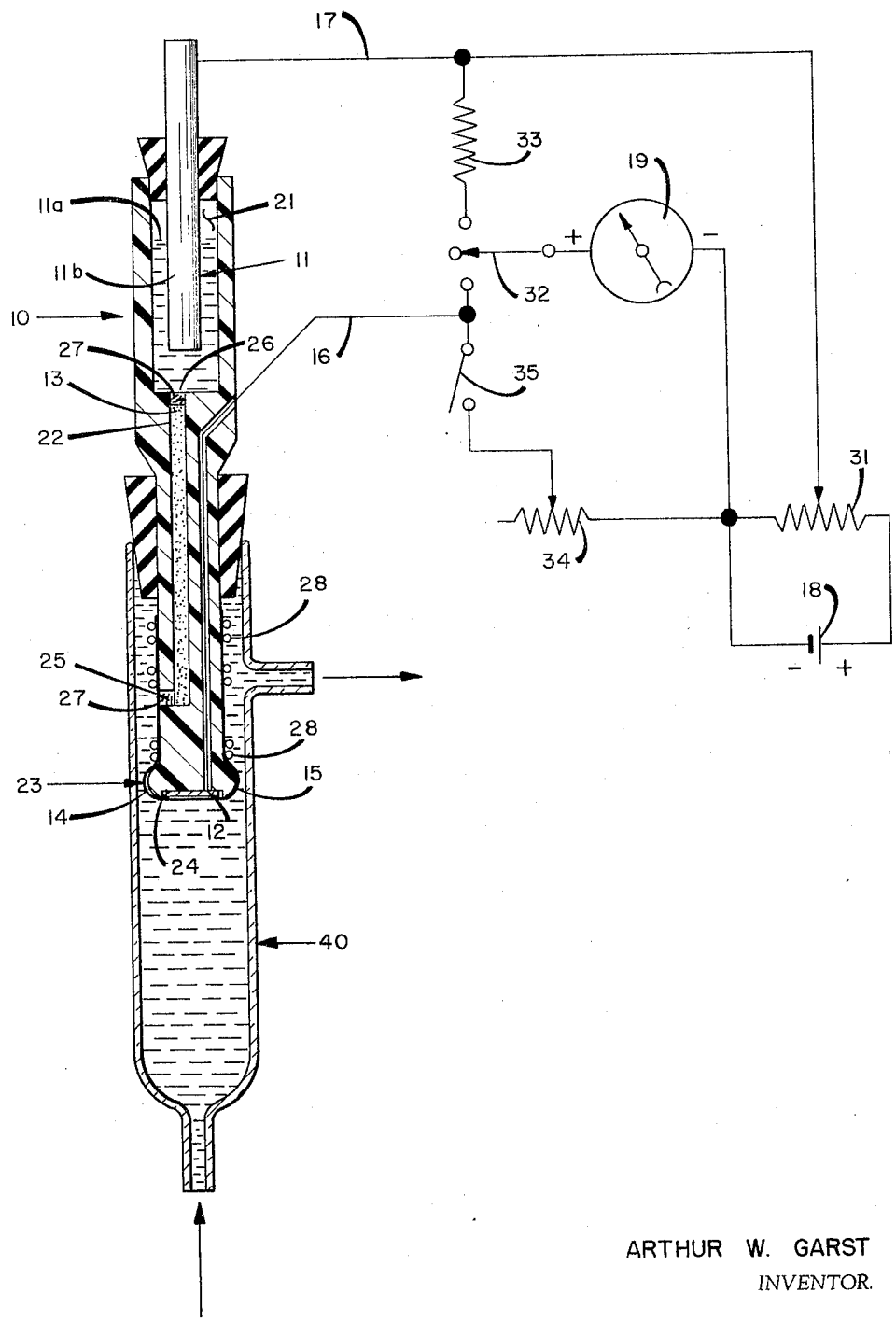

This invention relates to an electrochemical device for use in chemical analyses, and particularly to an amperometric cell for use in the quantitative determination of oxygen in a sample.

Various types of oxygen sensing devices are known for use in the field of analytical chemistry. Typically, these devices utilize an electrolytic cell containing a pair of spaced apart electrodes in contact with an ion-conducting solution serving as an electrolyte, and an indicator is employed in the external circuit to indicate changes in the electrical characteristics of the cell. Chemical reactions occurring at the electrodes cause the electrical characteristics of the cell to change and such changes may be employed as an indication of the oxygen content of the sample which is being tested. Heretofore, cells employing selective membranes have been used to prevent contamination of the electrolyte and poisoning of the electrode by substances with interfere with the electrode reactions (for example, see U.S. Patent 2,913,386).

In general, the prior art oxygen sensing devices have been capable of measuring small concentrations of oxygen in a sample, but such devices have been found to be incapable of quantitatively determining extremely small amounts of oxygen. It has been determined, however, that it is highly important to accurately determine dissolved oxygen in very small amounts, in the range of a few parts per billion, for example, in order to minimize the corrosion in certain types of water handling equipment. Further, the accuracy and dependability of certain of the prior art oxygen meters are adversely affected by the presence in the sample of various salts, hydrogen sulfide, hydrocarbons and other contaminants.

An object of the present invention is a device for accurately determining the oxygen content of a fluid sample containing extremely small amounts of oxygen, which device permits rapid operation by unskilled personnel.

Another object of the invention is a device of the above-mentioned type which is readily portable, rugged and relatively inexpensive.

A further object of this invention is an oxygen sensing device which can handle with accuracy liquid samples of varying degrees of salinity, which is relatively insensitive to changes in pH, and which is not adversely affected by the presence in the sample of contaminates, such as hydrogen sulfide.

The above objects and other objects of the invention will be apparent from the following description of the invention and the accompanying drawing of a preferred embodiment of the invention.

In accordance with the present invention there is provided an amperometric cell for determining the oxygen content of a fluid sample, which cell comprises a sensing electrode, a reference electrode spaced apart from said sensing electrode, and an electrolyte positioned between and in direct contact with said electrodes, said electrolyte having a low capacity for dissolved oxygen, i.e., less than about 1.3 milliliters of oxygen per liter of electrolyte at 25° C. The cell preferably utilizes a bridge of an immobilized electrolyte of the gel type positioned between the electrodes. A membrane member separates the electrolyte from the sample fluid on the exterior of the cell, the membrane member being adapted to be exposed to the sample to be tested and effectively sealing the cell from the sample, but being selectively permeable to oxygen contained in the sample. In a preferred embodiment of the invention, the reference electrode is a carbon-thiosulfate half cell, and the sensing electrode is an inert metal, such as platinum, and the membrane member is a thin film of a plastic such as polyethylene.

Referring to the drawing, which illustrates a preferred embodiment of the present invention, there is included in the cylindrical cell body 10 a pair of electrodes 11 and 12 which are spaced apart in a predetermined fixed relationship and in direct contact with an ion-conducting bridge material 13 which serves as an electrolyte between the electrodes. The sensing electrode 12 and the junction 14 of the sensing electrode with the electrolyte is surrounded by an insulating membrane member 15 which is impermeable to, and effectively seals the electrode 12 and the junction 14 from, substances exterior of the cell, while being selectively permeable to oxygen contained in the sample so as to permit passage only of such oxygen through the membrane. The electrodes are connected to an external circuit by electrical leads 16 and 17. A predetermined electrical potential is supplied by the power source 18 across the electrodes, and indicator means 19 such as an ammeter, polarographic recorder, etc., is employed to measure the current flow in the system and to indicate changes in the electrical characteristics of the cell which result from variations in the oxygen content of the sample being tested.

The sensing electrode 12 preferably is a precious metal such as platinum, gold, palladium or other similar metals which are inert to and compatible with the electrolyte employed in the cell. The reference electrode 11 comprises carbon 11b in contact with a solution 11a of an anionic substance capable of being oxidized to a higher state at a low voltage, i.e., less than about 0.2 volt, without interference from the presence of oxygen. Sodium thiosulfate or sodium sulfite may be employed for this purpose.

The membrane member 15, typically, is formed of a thin film of polyethylene, Teflon, polyvinyl chloride, natural rubber, silicone rubber, or other insulating materials which effectively seal the cell from materials exterior thereof while permitting oxygen contained in the sample to pass through the membrane to contact the electrode 12 and the electrolyte 13. The membrane member may comprise a layer of oil or other similar material effective for the aforesaid purposes. Preferably, the membrane member fits tightly against the cell body so as to reduce the oxygen transport distance and minimize the response time of the cell.

The electrolyte 13 preferably has a low oxygen solubility, i.e., less than about 1.3 milliliters of oxygen per liter at 25° C., but it should have sufficient solubility to permit transport of the oxygen. This type electrolyte significantly improves the response time of the cell. Advantageously, the electrolyte has a very low viscosity so as permit rapid diffusion of the oxygen in the electrolyte, which results in faster response. Concentrated aqueous ammonium chloride has been found to be an unexpectedly superior electrolyte, although other electrolytes such as aqueous magnesium chloride may be useful. The preferred electrolyte is buffered strong ammonium chloride and typically the buffering agent is ammonium acetate. For an example, a highly effective electrolyte is prepared having the following composition:

5 N ammonium chloride _____ml__ 400
Ammonium acetate _____g__ 50
Distilled water _____ml__ 50

As prepared, the ammonium chloride solution typically has a pH between 3 and 6, and advantageously, the electrolyte solution is rendered alkaline and the pH of the solution is adjusted between 8.2 and 8.4, for example by using concentrated ammonium hydroxide.

Advantageously, the electrolyte comprises a bridge of the electrolyte immobilized with a gel, such as agar or other well-known gelling agents compatible with the electrolyte. The immobilized electrolyte bridge preferably is joined to the sensing electrode by a thin film of the liquid electrolyte solution held in place by the membrane member which encloses the sensing electrode and the lower end of the gel bridge.

In fabricating the cell, the cell body 10 is formed of an insulating material, preferably a rigid plastic, such as Lucite. The cell body is provided with an upper cavity 21 forming the chamber for positioning the reference electrode, and a longitudinal cavity 22 extending downwardly from the upper cavity and extending therefrom at an angle to the outside surface of the cell body as shown to provide communication with the sensing electrode. The lower end of the cell body is provided with a bulb 23 which permits the membrane member 15 to be more securely attached to the cell body. The bottom of the bulb is provided with a recess 24 to receive the flat disc-like sensing electrode and a longitudinal opening is provided in the cell body for the electrical lead 16 which connects the electrode 12 with the external circuit. Typically, the cathode 12 is a one-half inch diameter x 0.017 inch thick platinum disc flush-mounted in the bottom end of the cell body.

The geometry of the oxygen sensing cell has been found to be of importance. For example, if the disc-like platinum cathode is mounted on the end of a purely cylindrical cell body having a diameter only slightly greater than the diameter of the cathode, then the selective plastic membrane is difficult to hold in a fixed position with respect to the cathode for any great length of time, resulting in variable readings when the cell is exposed to air-saturated water. Furthermore, if the membrane film is drawn too tightly against the cathode, the contact between film and cell body becomes too tight at the bottom edge of the cell body with the result that the internal electrical resistance of the cell becomes so great as to greatly diminish the maximum current delivered when the cell is exposed to air-saturated water. This, in turn, greatly lengthens the response time of the cell when it is moved from air-saturated to air-free water.

I have found a bulbous form of the cell body just above the platinum cathode level most advantageous. However, there appear to be certain limitations in the size of the bulbous portion. Too large a bulbous portion of the cell body results in slowing down the rate of diffusion by which the pH of the electrolyte adjacent to platinum cathode is maintained constant. The result is that the cell will appear to have a very rapid response time and will actually deliver reverse current for a while after being moved from air-saturated to air-free water. It has been determined that most satisfactory operation is obtained if the flat on the plastic surrounding the platinum cathode is in the form of an annular ring, typically, about $\frac{1}{16}$ inch wide. The bulbous portion of the plastic body should not be more than 50% wider than the width (diameter) of the platinum cathode. The vertical dimension (height) of the bulbous portion may vary from about one-fourth to three-fourths the width (diameter) of the platinum cathode. For example, in the case of a one-half inch diameter cathode, the bulbous portion should be from one-eighth to three-eighths inch high by five-eighths inch in maximum width.

The operation of the sensing electrode is believed to be as follows: In the total absence of dissolved oxygen, the buffered ammonium chloride contacting the platinum sets up a potential which is a function of the pH of the electrolyte. The amperometric circuit supplies an opposing potential which permits no current to flow when the potentials are exactly balanced.

When dissolved oxygen is present, the potential developed at the platinum falls. This is readily observed if a potential measuring device is substituted for the amperometric circuit. With the amperometric circuit in service, current supplied by the battery does flow and the amount of current is proportional to the rate of oygen arrival at the platinum cathode. The rate of oxygen arrival at the platinum cathode is a measure of the oxygen tension or partial pressure in the fluid outside the polyethylene membrane. The electric current will effectively measure the oxygen tension outside the polyethylene membrane so long as the effective area of the platinum remains constant and so long as the pH of the electrolyte remains constant. The permeability of the polyethylene film must also remain constant. Temperature changes have a large effect on the current rate and must be eliminated, compensated, or correction factors used.

Oxygen tension or partial pressure can be equated to oxygen concentration using data showing the solubility of oxygen in the fluid under test. The subject oxygen meter actually reads oxygen tension or partial pressure and it is necessary to convert these readings to oxygen concentrations. If basic data regarding oxygen solubility are not available, the readings can be made in terms of "percent air saturation."

In assembling the device shown in the drawing the lower opening 25 and the upper opening 26 of the longitudinal cavity 22 in the cell body are packed with a packing material 27, such as glass wool or other inert fibrous packing. The cell body is then immersed in a heated solution of about 3% agar in the buffered ammonium chloride so that the lower opening is well covered. The ammonium chloride-agar electrolyte solution is then drawn into the opening using a vacuum applied at the upper opening and the solution permitted to cool. The excess of the resulting gel is removed from the exterior of the cell body, and the assembly is completed by covering the cathode 12 and the lower opening 25 with a thin, continuous film of the liquid buffered ammonium chloride solution held in place by a polyethylene membrane. This latter liquid electrolyte solution merely forms an effective junction between the immobilized electrolyte bridge and the cathode. If desired, other arrangements can be employed to provide contact with the cathode. Care is taken to eliminate the entrapment of air between the membrane and the cell body and the membrane is tightly secured to the cell body by means of elastic seals 28 so as to prevent the dilution of the electrolyte with sample during the use of the cell. A gasket sealant or other like material may be employed to effect a better seal between the membrane and the cell body. A strong sodium thiosulfate solution, e.g., 75 grams of $Na_2S_2O_3 \cdot 5H_2O$ in 100 milliliters of distilled water is poured into the upper chamber 21 and a carbon rod such as a spectroscopic carbon electrode, graphite rod or the like is mounted in the chamber as shown.

As mentioned above, it is necessary to prevent enclosing oxygen between the membrane member and the cell body, hence it is highly advantageous to include in the buffered ammonium chloride solution between the membrane member and the cell body an oxygen scavenging substance, i.e., one which reacts with dissolved oxygen fairly rapidly without affecting the cell reactions. For this purpose pyrogallol, in an amount between about 0.0001% and about 0.1% may be added to the electrolyte. The presence of the scavenging agent greatly reduces the time required to rid the cell of oxygen when the cell is removed from a saturated fluid to a fluid containing very low oxygen content. Qualitative observations made using such a pyrogallol containing buffered ammonium chloride electrolyte having a pH of 8.2 indicate that the cell exhibits an unusually stable zero reading when immersed in an alkaline pyrogallol solution. For example, such a cell has been found to deviate no more than 0.001 microampere from zero over a 24-hour period, which corresponded to a reading of only 0.2 part per billion dissolved oxygen in the solution.

The operating voltage for the above-described cell is obtained typically with a 1,000 ohm potentiometer 31 mounted across a 1.5 volt battery 18. An indicator means 19, such as a microammeter, is connected in series with the cell through one side of switch 32 which is a double pole, double throw, center off switch and the microammeter is connected to the center position of this switch. When the switch is thrown in one direction the microammeter is in series with the cell, and when in the second position the microammeter is in series with a resistor 33 selected to make the microammeter to read as a volt meter showing the voltage delivered from the battery and from the potentiometer 31. The second potentiometer 34 is used as a variable resistance shunt in parallel with the microammeter when switch 35 is closed. The use of this variable shunt permits the use of a microammeter whose full scale reading is considerably less than the maximum current delivered when the cell is exposed to air-saturated water. When switch 32 is in the center position and switch 35 is closed, the microammeter is out of the circuit but current still flows through the cell. This permits the cell to be stored in a low oxygen content solution with the current on while the microammeter is disconnected.

In calibrating the cell the proper operating voltage is determined at which the cell will deliver zero current when exposed to a fluid with essentially zero oxygen content. For practical purposes this can be achieved by immersing the polyethylene membrane covered end of the cell in an alkaline pyrogallate solution such as is used for oxygen absorption in the Orsat apparatus. The operating voltage is adjusted to about 0.38 volt and readjustment made as required until a stable zero current is obtained. The time required at this point is a function of the previous history of the cell.

The cell may be stored in an oxygen scavenger, such as alkaline pyrogallate solution or in the buffered ammonium chloride solution to which a little pyrogallol has been added. Operating voltage preferably is applied to the cell during storage. Following such storage the calibration to determine the operating voltage requires only a few seconds.

Calibration of the top end of the scale is obtained by adjusting the variable shunt resistance 34 while the cell is exposed to air-saturated water. The temperature of the water should be recorded at the time the adjustment is made. An alternate method of calibration consists of wetting the cell and waving it in the air until equilibrium is reached. Corrections can be made for error introduced because of differences between the cell temperature and the air temperature.

The time required to obtain equilibrium current is a function of the previous history of the cell. An air-saturated cell will require a longer time than a cell which has been stored in air-free water.

The above-described cell is sensitive to temperature effects. Hence it should be used under substantially constant temperature conditions or temperature changes compensated for or corrections made. A temperature correction curve can be prepared from a series of observations made at different temperatures.

In use, the cell is mounted in a sample container, such as a flow cell 40 containing the sample to be tested. Preferably, the sample flows through the container to aid in maintaining equilibrium between the cell and sample. Typically, the sample flow is directed against the lower end of the cell and a flow rate of 50–100 ml. per minute is employed. The sample temperature is determined, and, if desired, adjusted by heat exchange means provided in the system to bring the sample to the desired temperature.

The above-preferred device has been successfully employed in determining the oxygen content of various water samples containing less than 10 parts per billion oxygen, and is sensitive to 1 part per billion or less oxygen in a sample.

While my invention has been described with reference to the particular embodiments described herein, it is to be understood that variations and modifications within the skill of the artisan will become apparent from the foregoing description, and as such, fall within the spirit and scope of the appended claims.

What I claim is:

1. In a method for measuring the oxygen concentration in a fluid in which method a sensing electrode is exposed to said fluid and the electrical current between said sensing electrode and a reference electrode is measured as an indication of oxygen concentration in said fluid, the improvement comprising:
    employing as said sensing electrode a metal in an electrolyte surrounded by a membrane permeable to oxygen, said electrolyte being an alkaline aqueous solution of ammonium chloride and said metal being inert to said electrolyte,
    and employing as said reference electrode carbon in an electrolyte which is an aqueous solution of a sulfur-containing salt selected from the group consisting of alkali metal thiosulfates and alkali metal sulfites.

2. The method of claim 1 in which the electrolyte of said reference electrode is an aqueous solution of sodium thiosulfate.

3. The method of claim 1 in which said metal of said sensing electrode is selected from the group consisting of platinum, gold and palladium and said aqueous solution of ammonium chloride is buffered with ammonium acetate and has a pH between about 8.2 and about 8.4.

4. The method of claim 3 in which the electrolyte of said reference electrode is an aqueous solution of sodium thiosulfate.

5. The method of claim 1 in which said metal in said sensing electrode is platinum, said aqueous solution of ammonium chloride is buffered with ammonium acetate and has a pH between about 8.2 and about 8.4, said membrane is polyethylene and the electrolyte of said reference electrode is an aqueous solution of sodium thiosulfate.

No references cited.

JOHN H. MACK, *Primary Examiner.*

T. TUNG, *Assistant Examiner.*